US008286316B2

(12) United States Patent
Lehnert et al.

(10) Patent No.: US 8,286,316 B2
(45) Date of Patent: Oct. 16, 2012

(54) TOOL FOR REMOVING A CHISEL

(75) Inventors: Thomas Lehnert, Oberraden (DE); Martin Lenz, Grossmaischeid (DE); Bernd Holl, Neustadt/Wied (DE); Günter Hähn, Königswinter (DE)

(73) Assignee: Wirtgen GmbH (DE)

(*) Notice: Subject to any disclaimer, the term of this patent is extended or adjusted under 35 U.S.C. 154(b) by 0 days.

(21) Appl. No.: 13/449,651

(22) Filed: Apr. 18, 2012

(65) Prior Publication Data

US 2012/0198678 A1 Aug. 9, 2012

Related U.S. Application Data

(63) Continuation of application No. 12/454,708, filed on May 21, 2009, now Pat. No. 8,181,322.

(30) Foreign Application Priority Data

May 26, 2008 (DE) ......................... 10 2008 025 071

(51) Int. Cl.
*B23P 19/04* (2006.01)
*B25B 27/02* (2006.01)

(52) U.S. Cl. ............................... 29/243; 29/252; 29/270

(58) Field of Classification Search .................... 29/243, 29/243.5, 243.517, 244, 251–253, 256–258, 29/270, 281.6
See application file for complete search history.

(56) References Cited

U.S. PATENT DOCUMENTS

| | | | |
|---|---|---|---|
| 2,297,160 | A | 9/1942 | Nally |
| 3,342,531 | A | 9/1967 | Krekeler |
| 4,329,766 | A | 5/1982 | Leonard et al. |
| 4,337,980 | A | 7/1982 | Krekeler |
| 4,966,418 | A | 10/1990 | Wirtgen |
| 5,092,660 | A | 3/1992 | Steinkuhl et al. |
| 5,438,860 | A | 8/1995 | Kawai et al. |
| 5,477,932 | A | 12/1995 | Asakura et al. |
| 6,233,803 | B1 | 5/2001 | Rose |
| 6,415,490 | B1 | 7/2002 | Caruso et al. |
| 6,526,641 | B1 | 3/2003 | Latham |
| 7,401,862 | B2 | 7/2008 | Holl et al. |
| 7,644,994 | B2 | 1/2010 | Busley et al. |
| 7,901,010 | B2 | 3/2011 | Busley et al. |
| 7,922,255 | B2 | 4/2011 | Busley et al. |
| 2007/0132304 | A1 | 6/2007 | Holl et al. |
| 2009/0019679 | A1 | 1/2009 | Hahn et al. |
| 2009/0293249 | A1 | 12/2009 | Lehnert et al. |

FOREIGN PATENT DOCUMENTS

| | | | |
|---|---|---|---|
| CN | 1816432 | A | 8/2006 |
| CN | 201439192 | U | 4/2010 |
| DE | 3026930 | A1 | 10/1981 |
| DE | 3223761 | A1 | 12/1983 |
| DE | 8403441 | U1 | 5/1984 |
| DE | 8625406.5 | U1 | 12/1986 |
| DE | 3903482 | A1 | 8/1990 |
| DE | 3935691 | A1 | 5/1991 |

(Continued)

*Primary Examiner* — David B Thomas

(74) *Attorney, Agent, or Firm* — Waddey & Patterson, P.C.; Lucian Wayne Beavers

(57) ABSTRACT

A tool for removing a chisel, in particular from a chisel holder, having a base element which receives an actuating member, wherein the actuating member has an expeller mandrel. The actuating member is adjustable along a displacement direction. In order to be able to perform the removal simply and rapidly, the actuating member of this invention is indirectly or directly coupled to a piston of a fluid-charged cylinder, or to an electric motor unit.

24 Claims, 8 Drawing Sheets

FOREIGN PATENT DOCUMENTS

| | | | |
|---|---|---|---|
| DE | 9310542 | U1 | 11/1993 |
| DE | 4323669 | A1 | 1/1995 |
| DE | 4437046 | A1 | 6/1995 |
| DE | 19512349 | C1 | 10/1996 |
| DE | 29623508 | U1 | 7/1998 |
| DE | 10044369 | A1 | 4/2002 |
| DE | 10331970 | A1 | 2/2005 |
| DE | 202005011206 | U1 | 9/2005 |
| DE | 102005001535 | B3 | 8/2006 |
| DE | 202007010047 | U1 | 9/2007 |
| EP | 1013829 | A2 | 6/2000 |
| EP | 1167626 | A1 | 1/2002 |
| RU | 2039643 | C1 | 7/1995 |
| SU | 969497 | A1 | 10/1982 |
| SU | 1183345 | A1 | 10/1985 |
| SU | 1187975 | A1 | 10/1985 |
| WO | 9723710 | A1 | 7/1997 |
| WO | 2005005119 | A1 | 1/2005 |

TOOL FOR REMOVING A CHISEL

BACKGROUND OF THE INVENTION

1. Field of the Invention

This invention relates to a tool for removing a chisel, in particular from a chisel holder, having a base element which receives an actuating member, wherein the actuating member has an expeller mandrel, and the actuating member is adjustable.

2. Discussion of Related Art

Similar tools are employed, for example, in connection with road milling machinery, recyclers, surface miners, and the like. They are used for removing chisels, in particular shank chisels, such as round shank chisels. In this case, the chisels are clampingly held in chisel receivers. Customarily, the chisel receivers are designed as through-bores. The chisel holders themselves are fastened to the surface of a milling roller tube, in particular welded to it, or are interchangeably fixed in base supports, which also are welded to the surface of a milling roller tube. Tools are known for making the removal of the chisels easier, such as are described in German Patent Reference DE 296 23 508 U1.

This tool has two lever arms, which are connected with each other by a joint. Here, one of the arms constitutes the expeller mandrel, and the other lever constitutes a handle element. The expeller mandrel can be inserted with its free end into the chisel receiver so that its end contacts the chisel shank of the chisel to be expelled.

The tool can be placed with the second lever against a support shoulder on the milling roller tube. Then, the chisel can be pushed out of the chisel receiver by a lever displacement. Finally, the expeller mandrel is threaded out of the chisel receiver. In the restricted assembly space, the manipulation of the double lever is difficult and is time-consuming. Further, the tool requires a support shoulder on the milling roller, which is not always available.

Removal tools are also known, which can be placed with draw-off claws against the chisel head of the chisel. In this case, a circumferential groove is required in the chisel head, into which the draw-off claws enter. It is not possible to perform a removal of the chisels, if the chisel heads are worn to such a large extent that the groove is no longer sufficiently available. Also, chisels with broken-off chisel heads cannot be removed. Such tools are known from German Patent References DE 43 23 699 C2, DE 32 23 761 A1, and DE 84 03 441 U1 and U.S. Pat. No. 6,526,641 B1.

A further tool is described in German Patent Reference DE 30 26 930 A 1. This tool has a support arm, which can be fixed in place against the chisel holder. A pivot lever, which has a handle, is coupled with the support arm. The chisel holder has a linearly displaceable plunger. For removing the chisel, a pivot arm facing away from the handle is placed against the plunger. As a result of displacing the handle, the plunger can be displaced and the chisel can be pushed out of the chisel receiver by it. The plunger, which is structurally connected with the chisel holder, constitutes an additional part and assembly cost. Further, it requires an increase in the structural space in the chisel holder, which is not always acceptable in connection with modern precision milling machines.

Also, this type of construction requires the fixation of the chisel in a blind hole-like chisel receiver which can become soiled during operation, which leads to a loss of the system.

SUMMARY OF THE INVENTION

It is one object of this invention to provide a tool of the type mentioned above but in which chisels can be simply and rapidly exchanged.

This object is attained in that the actuating member is coupled indirectly or directly to a fluid-charged cylinder-piston system, or to an electric motor-driven unit. For example, the cylinder can be a fluid cylinder, in particular a hydraulic cylinder, which can be charged via an oil circuit. With this it is possible to build up a large pressure on the piston and to transmit correspondingly large forces to the actuating member. Thus it is possible to dependably remove chisels without a large force expenditure. The electric motor driven unit can, for example, be a spindle-nut unit, which can be driven by an electric motor.

In accordance with one embodiment of this invention, the actuating member is seated on the base element, pivotable around a stationary pivot bearing. The base element can be associated with the chisel holder, and a reproducible expelling process can be realized via the stationary pivot bearing.

If, with the displacement movement of the actuating member, the expeller mandrel moves on a curved course, it is possible to realize a varying progression of the moment. For example, with an appropriate layout of the tool it is possible to generate a high moment at the start of the displacement movement, which is then continuously reduced. Thus the condition, at the start of the displacement movement when it is necessary to initially overcome the frictional adherence between the chisel and the chisel receiver, is simply met.

In a preferred manner, the base element has a support section for direct support on the chisel holder, or indirectly on the chisel holder, for example on a wear disk. With the stationary assignment of the tool to the chisel holder it is possible to do without additional support elements, for example an expelling shoulder on the milling roller tube. Thus it is possible to realize a more compact arrangement of the individual chisel holders on the milling roller tube and no additional cost outlay is required, such as with the prior art.

Preferably, those locations on the chisel holder are used for the support, which are not subject to excessive wear, so that the tool can always be placed in a reproducible manner. The wear disk in particular, which is customarily arranged between the chisel head and a support surface of the chisel holder, provides an ideal support location.

For example, the support section can be arranged on a fork-shaped expelling element. The tool can be placed against the chisel holder with the fork-shaped expelling element so that the support section comes to lie on the side of the chisel head of the chisel. There, the support section can engage the wear disk.

In accordance with one embodiment of this invention, distanced from the support section, the base element has an externally located contact face for placement against the chisel holder. It is possible with the support section and the contact face to provide a definite assignment of the tool and the chisel holder. Thus, the tool can always be associated in the same way with the chisel holder.

In one embodiment of this invention, the base element has a receptacle, in which the actuating member is received between two lateral walls which delimit the receptacle, and the lateral walls have seating receptacles in which the actuating member is pivotably seated.

This simple structural design makes possible the stable guidance of the actuating member between the two lateral walls.

In one embodiment of this invention, the displacement movement of the actuating member is limited by at least one stop arranged on the base element. Then the displacement movement of the actuating member can be limited. In this case, the actuating member can be controlled so that the jamming of the actuating member in its end position is not possible.

In case of an appropriate limitation, the actuating member is positioned by a stop in its initial position so that the easy placement against the chisel holder is possible. The limitation of the actuating movement of the actuating member in the removal position prevents the actuating member from becoming jammed in the chisel receiver.

In particular, the actuating member can be movable out of its initial position into the removal position, and the actuating member can be maintained in a spring-loaded manner in its initial position by a spring element. This step assures that, when the cylinder is switched to no pressure, the actuating member remains in its initial position, or respectively returns into it. For example, in case of the use of a double-acting cylinder, it is possible to do without the spring-loading.

In order to achieve a simple and dependable operation of the tool also in locations which are hard to access, the base element is coupled with a handle element indirectly or directly by a connecting member, and the handle element is pivoted with respect to the base element by a pivot bearing.

In one embodiment of this invention, the expeller mandrel is connected to a lever arm having a coupling for the pivotable connection of the piston rod, and the lever is pivotably seated at a distance from the coupling.

BRIEF DESCRIPTION OF THE DRAWINGS

This invention is explained in greater detail in view of exemplary embodiments represented in the drawings, wherein.

DETAILED DESCRIPTION OF THE INVENTION

Figure 1:
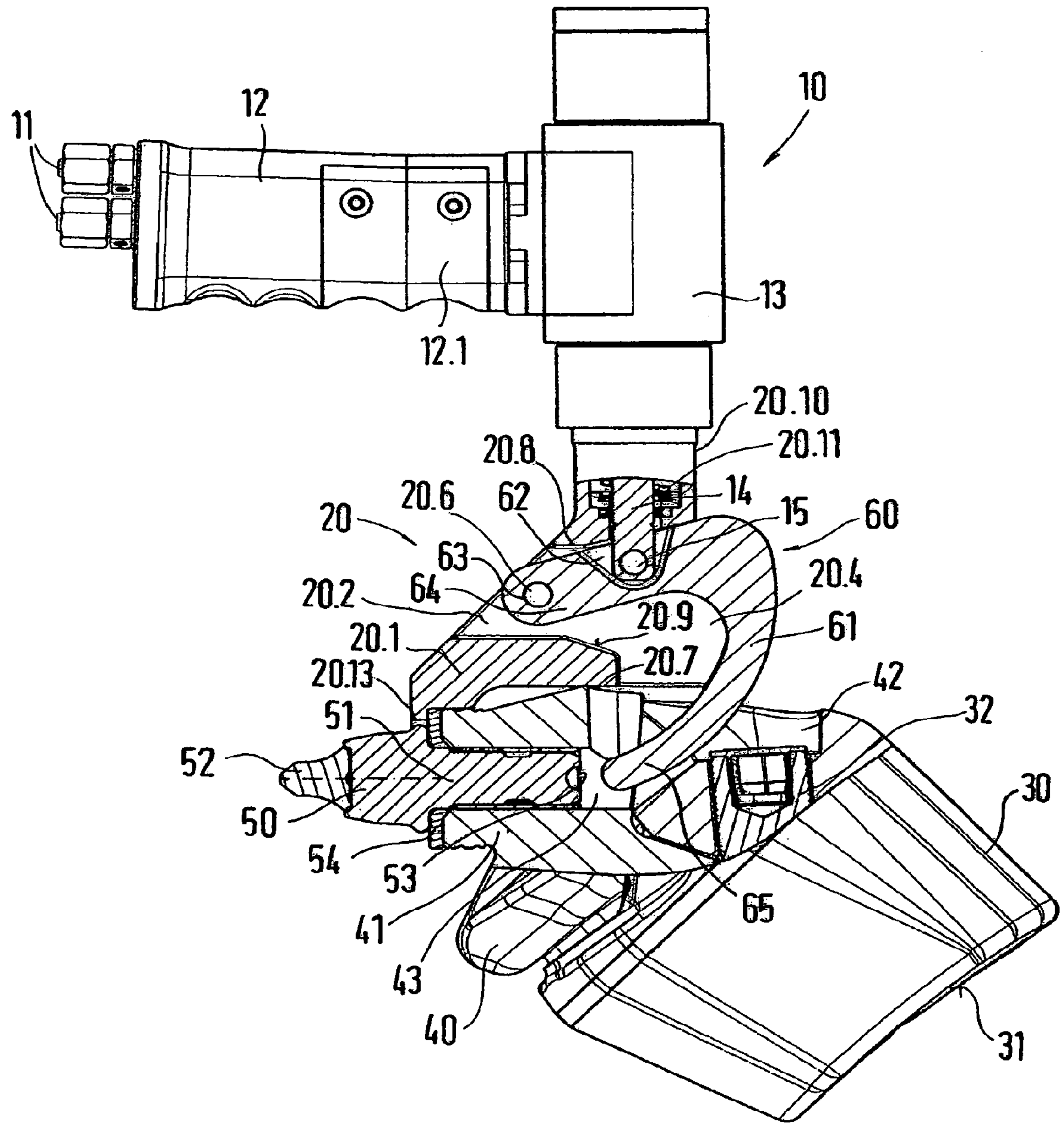
FIG. 1 shows a base support with a chisel holder, to which a tool is assigned, in a first operating position in a lateral view and in partial section.

FIG. 1 shows a tool 10 with a handle 12. A battery is integrated into the handle 12. The battery can be charged in an appropriate charging station via two electrical current contacts 11. The battery is used for supplying electrical current to an electric motor. The electric motor is contained in a housing attachment, which is connected to the handle 12. A cylinder 13 is contained in this housing attachment. The cylinder 13 can be embodied as a hydraulic cylinder, so that an appropriate hydraulic circuit system is integrated into the housing attachment. A piston is seated in the cylinder 13 and is displaceable between two end positions. A trigger 12.1 is installed on the handle 12. The trigger 12.1 closes a contact of an electrical circuit and thus activates the electric motor in the housing attachment. The electric motor, together with the hydraulic system, causes the displacement of the piston in the cylinder 13. Alternatively, it is possible to integrate lines into the handle 12, which are conducted to fluid connectors on the handle 12. The fluid connectors are designed as quick-release couplings.

They can be connected to counter-coupling elements of hoses. The hoses can extend, for example, from a hydraulic system of a road milling machine or a surface miner. The lines integrated into the handle 12 are conducted to the cylinder 13. Also, a piston is housed, linearly displaceable, in the handle 12. The displacement movement of the piston can be regulated by a valve, which is controllable by a trigger 12.1 on the handle 12. The adapter 20 represented in FIG. 4 can be connected to the cylinder 13. This adapter 20 will be explained in greater detail by referring to FIGS. 1 and 4. It has a base element 20.1. With two lateral walls 20.4, the base element 20.1 delimits a receptacle 20.2. An actuating member 60 in the form of a lever is pivotably seated in this receptacle 20.2. The actuating member 60 has a lever arm 64, to which an expeller mandrel 65 is connected in one piece. The expeller mandrel 65 is formed in the shape of a bow. The free end of the expeller mandrel 65 can be convexly crowned. On its end facing away from the expeller mandrel 65, the lever arm 64 has a bore, which constitutes or forms a seating receptacle 63.

Figure 4:
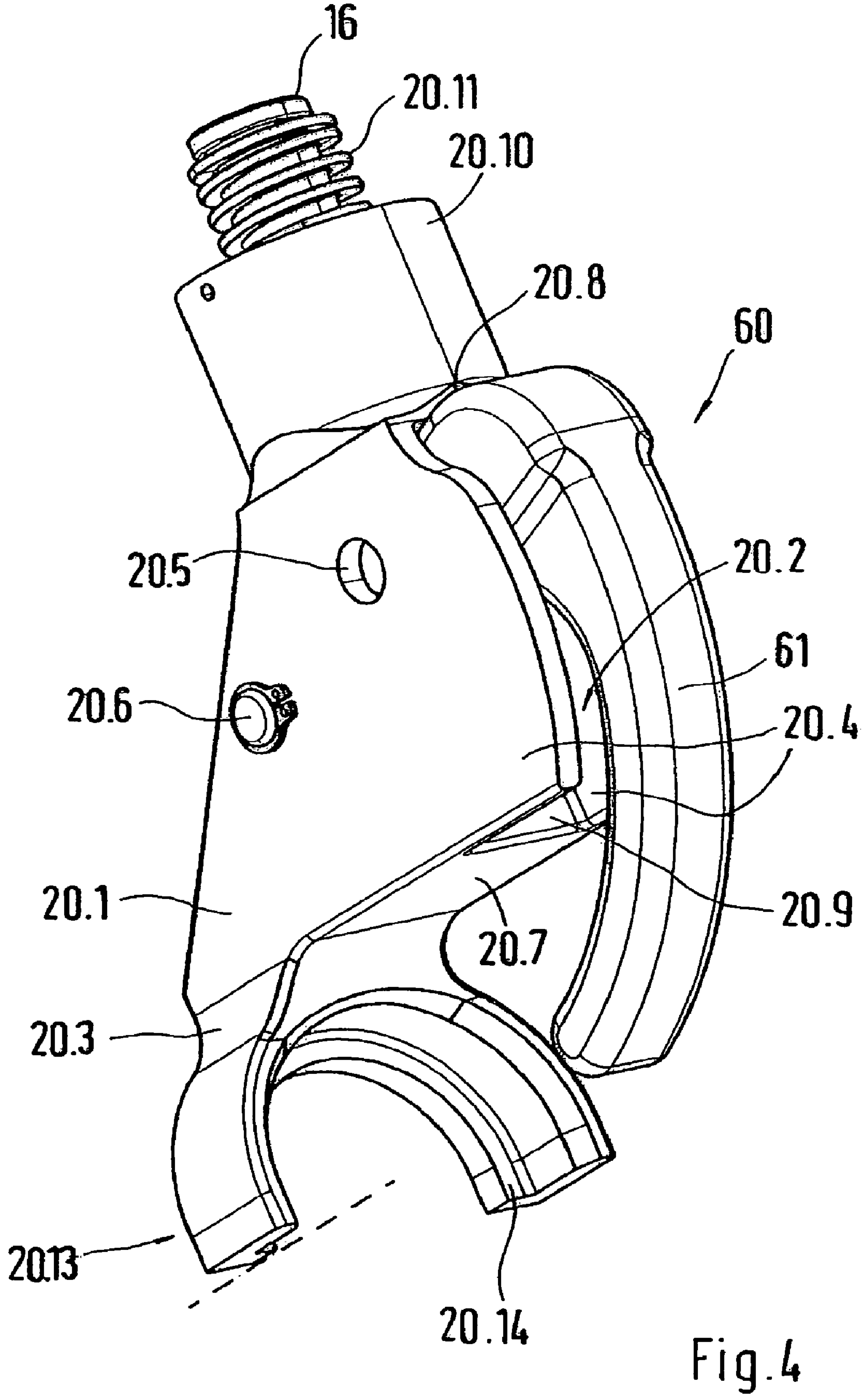
FIG. 4 shows an adapter of the tool represented in FIG. 1, in a perspective representation.

The seating receptacle 63 is aligned with corresponding bores in the lateral walls 20.4. A seating bolt 20.6 is pushed through the aligned bores and the seating receptacle 63, and can be secured by locking rings, as shown in FIG. 4. The seating bolt 20.6 constitutes or forms a rotary shaft which, in accordance with FIG. 1, extends vertically with respect to the drawing plane. The lever arm 64 has a coupling 62 in the area between the seating receptacle 63 and the connecting point of the expeller mandrel 65 on the lever arm 64. A piston rod 14 can be connected by its seating receptacle 15 with the coupling 62. On its end facing away from the seating receptacle 15, the piston rod 14 has a collar 16, as shown in FIG. 4. A connecting element 20.10 is formed in one piece on the base element 20.1. FIG. 1 shows that the connecting element 20.10 has a cup-shaped receptacle, which is in a spatial connection with the receptacle 20.2 via a through-bore. A spring element 20.11 is inserted into the cup-shaped receptacle. The spring element 20.11 can be designed as a helical spring. The piston rod 14 is conducted through the helical spring, so that the free end of the piston rod 14 comes into contact with the actuating member 60.

In the process, the piston rod 14 comes to lie with its seating receptacle 15 against the coupling 62. In the area of or near the coupling 62, the lever arm 64 has two bores aligned with each other, which can be aligned with the seating receptacle 15 in the piston rod.

Thus, the collar 16 of the piston rod 14 is placed against the spring end protruding from the cup-shaped receptacle. It is then possible to compress the spring element 20.11 by pressure on the collar 16 until the seating receptacle 15 is aligned with the bores in the coupling 62. A hinged bolt can be pushed through the aligned bores and the seating receptacle 15. As FIG. 4 shows, circular passages 20.5 are provided in the lateral walls 20.4.

With its bores, the lever arm 64 can be aligned with the bores in the coupling 62. It is then possible to expel the hinged bolt through the passages 20.5 into the bores of the lever arm 64 and through the seating receptacle 15. Simple coupling, or respectively uncoupling, of the piston rod 14 can thus be performed. In the coupled state, the piston rod 14 is maintained under spring pre-tension in the position shown in FIG. 1. Thus, the actuating member 60 is also fixed in this position.

The adapter 20 can be connected with the housing attachment by the connecting element 20.10. In this case a rotary seating is formed between the connecting element 20.10 and the housing attachment, so that the housing attachment can be rotated with respect to the base element 20.1. In the mounted state, the piston rod 14 rests with its collar 16 against the piston, which is guided in the cylinder 13. Here, the piston is arranged in the cylinder 13 in its end position, which defines the expelling position.

As shown in FIG. 1, stops 20.8 and 20.9 are provided in the area of or near the receptacle 20.1 of the base element 20.1.

Figure 3:
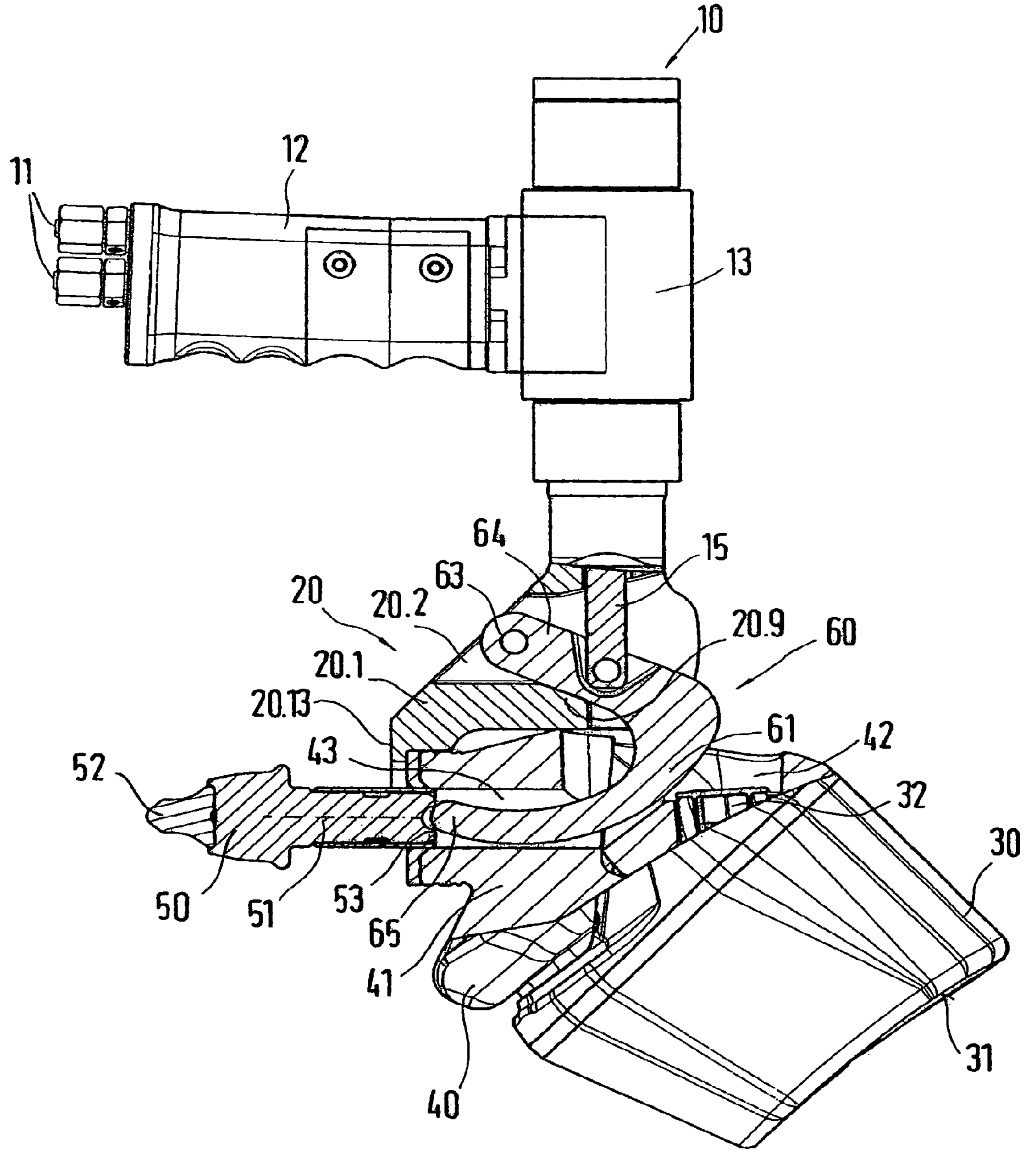
FIG. 3 shows the representation in accordance with FIG. 1, in a third operating position.

The stops 20.8 and 20.9 are used for limiting the displacement movement of the actuating member 60. Thus, the actuating member 60 has corresponding end faces, which can be brought into contact with the stops 20.8 and 20.9. In FIG. 1, the actuating member 60 rests against the stop 20.8. In FIG. 3, the actuating member 60 rests against the stop 20.9.

As shown in FIG. 4, an expelling element 20.13 is formed in one piece with the base element 20.1. The expelling element 20.13 is in a fork shape and has a support section 20.14.

The tool 10 is used for removing a chisel 50, which is received in a chisel holder 40. The chisel holder 40 is exchangeably maintained in a base support 30.

Thus, the base support 30 has a plug-in receptacle, which receives a plug-in shoulder of the chisel holder 40. The chisel holder 40 can be fixed in place on the base support 30 by an attachment screw 32. The base support 30 has a concave support face 31 which can be placed on the surface of a milling roller tube and welded in place on it. The chisel holder 40 has a neck 41, into which a chisel receiver 43 is cut in the form of a bore. The back of the chisel receptacle 43 is accessible through a cutout 42. In the present case, the chisel 50 is embodied as a round shank chisel and has a chisel head, on which a chisel shaft 51 is formed in one piece. A clamping sleeve is drawn on the chisel shaft 51. The clamping sleeve is maintained on the chisel shaft 51 so that it cannot be axially displaced, but is freely rotatable in the circumferential direction. As FIG. 1 shows, the chisel 50 is inserted with its chisel shaft 51 into the chisel receptacle 43 of the chisel holder 40 so that it is clampingly maintained therein by the clamping sleeve. In the inserted state, the chisel 50 is supported through its chisel head on a wear-protection disk 54, which is drawn on the chisel shaft 51. The wear-protection disk 54 is arranged between the chisel head and the clamping sleeve. With its side facing away from the chisel head, the wear-protection disk 54 rests against a support face of the chisel holder.

When operationally used, the chisel 50 can rotate with its chisel head on the wear-protection disk 54. In the process, the chisel shaft 51 also rotates in the clamping sleeve. In the customary manner, the chisel head of the chisel 50 has a chisel tip 52 of a hard alloy, for example.

Once the chisel reaches a worn-out state, it must be removed. Here, the tool 10 described in the drawing figures is used. The tool 10 is then placed on the chisel holder 40, while the expelling element 20.13 rests with its support section 20.14 on the front of the wear-protection disk 54. The expelling element 20.13 can also be indirectly or directly supported on a suitable, arbitrary location of the chisel holder 40.

In the process, a positive connection in the mounting direction of the chisel should be produced between the expelling element 20.13 and the chisel holder 40. Also, the base element 20.1 has a contact face 20.7, by which the base element 20.1 is supported on the surface of the chisel holder 40. It is possible to cause a defined coordination of the tool 10 and the chisel holder 40 by the contact face 20.7 and the support section 20.14. While placing the tool 10 against the chisel holder 40, the expeller mandrel 65 also moves through the cutout 42. In the process, the free end of the expeller mandrel 65 is arranged opposite the free end of the chisel shaft 51. The free end of the chisel shaft 51 forms a support face 53. Once the tool 10 is brought into the position shown in FIG. 1, the trigger 12.1 on the handle 12 can be operated.

Figure 2:
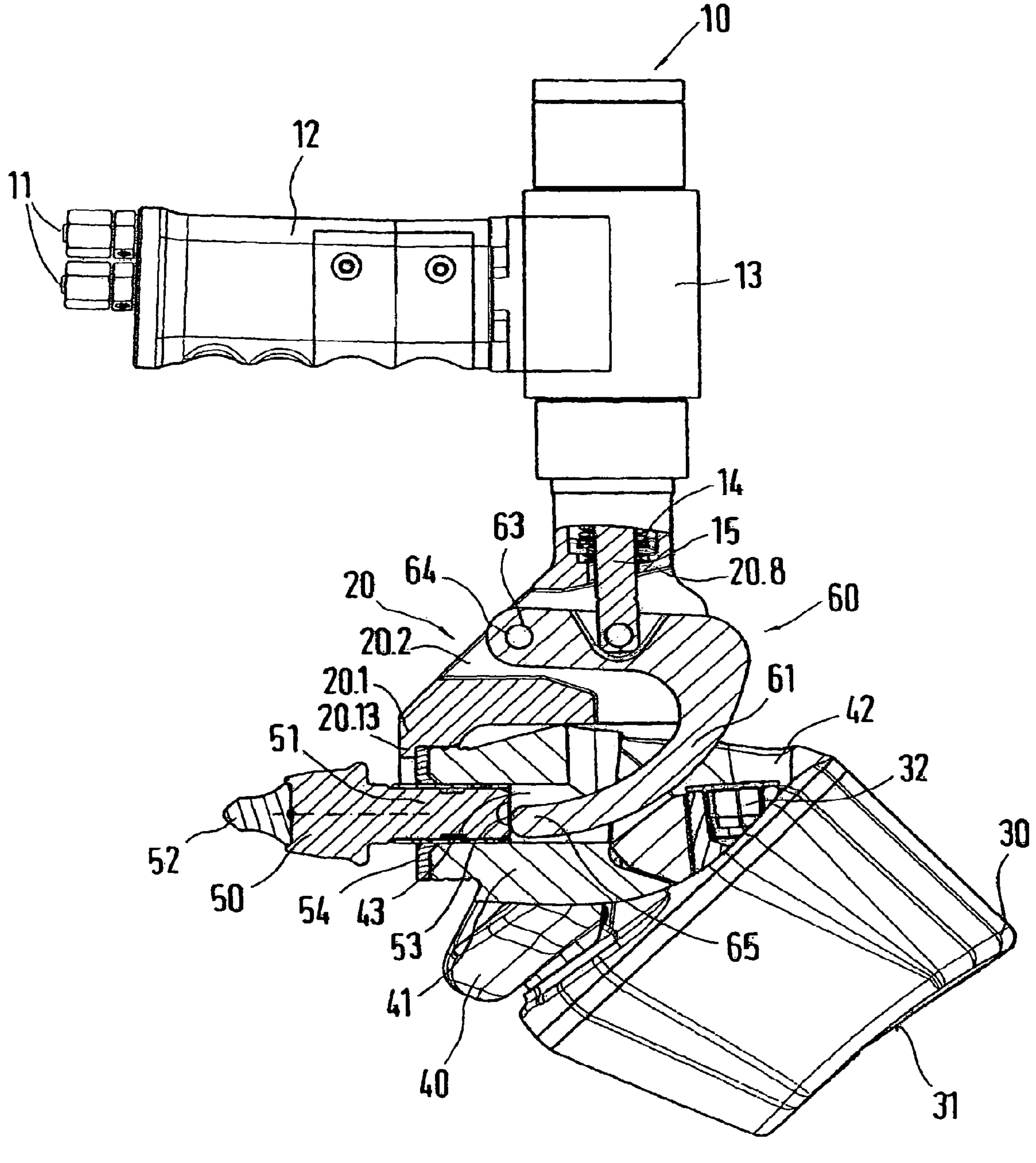
FIG. 2 shows the representation in accordance with FIG. 1, in a second operating position.

With the actuation of the trigger 12.1, the electric motor in the housing attachment is activated and supplies hydraulic fluid to the cylinder 13, so that the piston is displaced in the cylinder 13. Because the piston rests indirectly or directly against the collar 16 of the piston rod, the piston rod is also displaced into the positions shown in FIG. 2. The spring element 20.11 is also compressed during this displacement movement.

With the displacement of the piston rod 14, the actuating member 60 is pivoted around its seating receptacle 63. During this, the actuating member 60 dips with its expeller mandrel 65 into the chisel receptacle 43 so that the free end of the expeller mandrel 65 comes into contact with the support face 53 on the chisel shaft 51. With the displacement of the actuating member 60, the chisel 50 is pushed out of the chisel receptacle 43. During this, the support section 20.14 maintains the wear-protection disk 54 in its position. Accordingly, the clamping sleeve is pushed into the cylindrical bore of the wear-protection disk 54. During this, the clamping sleeve is compressed radially inward, because of which the clamping effect is partially compensated. Thus a lesser expelling force is required. The actuating movement of the actuating member 60 is limited by the stop 20.9.

In this final position, a switch also turns off the electrical current supply for the electric motor in the housing attachment. This operating position is shown in FIG. 3. Here, the chisel 50 is moved completely out of the chisel receptacle 43. Because power for the electric motor is cut off, the hydraulic pressure is removed from the piston.

Figure 6:
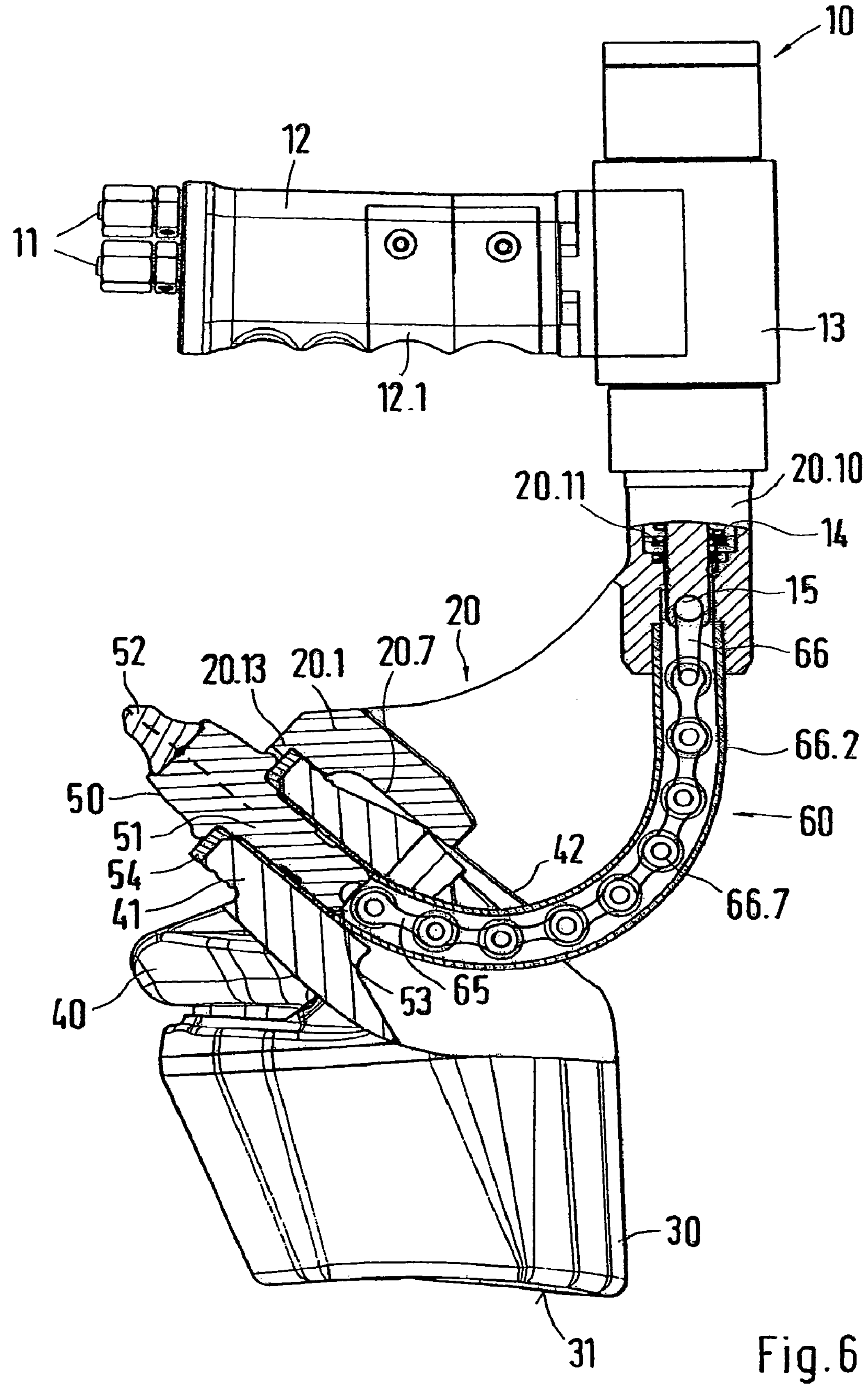
FIG. 6 shows the base support and the chisel holder in accordance with FIG. 1 in a lateral view and in partial section, in which a third embodiment variation of the tool is assigned to the chisel holder.
Figure 7:
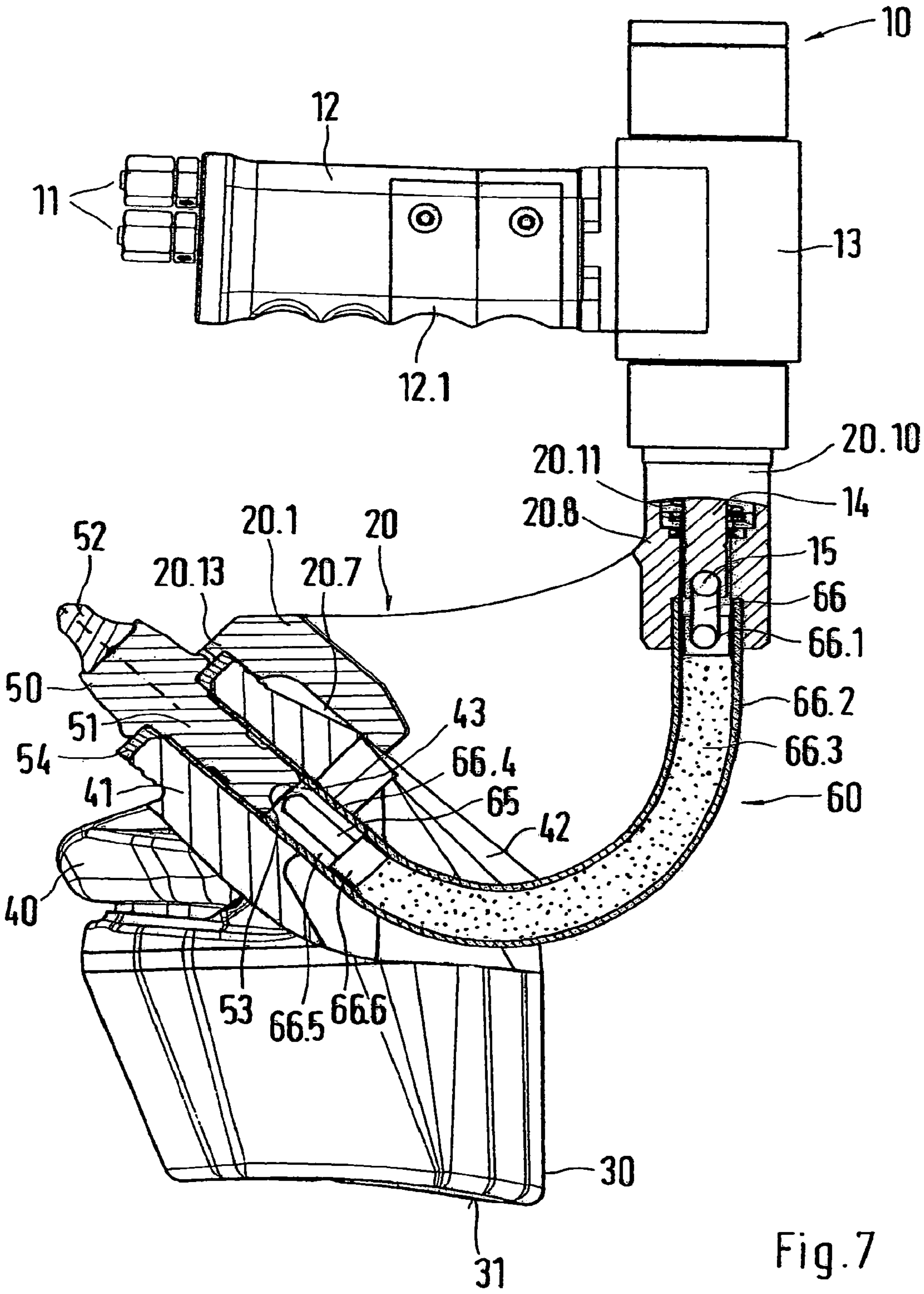
FIG. 7 shows the base support and the chisel holder in accordance with FIG. 1 in a lateral view and partial section, in which a fourth embodiment of the tool is assigned to the chisel holder.
Figure 8:
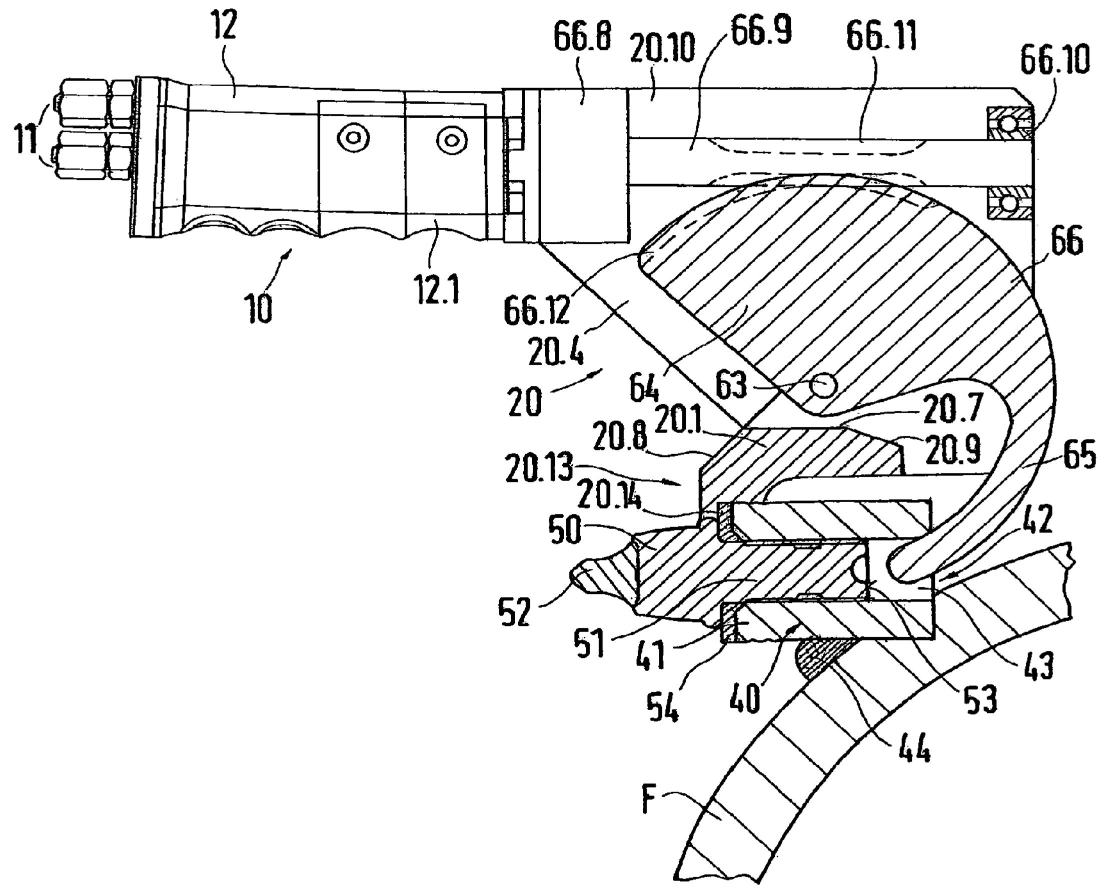
FIG. 8 shows a milling roller tube with a chisel holder fastened on it in a lateral view and in partial section, in which a fifth embodiment variation of the tool is assigned to the chisel holder.

The spring element 20.11 can then reduce its pre-tension, so that the actuation member 60 is moved back in a counterclockwise direction into its initial position shown in FIG. 1. During this, the piston in the cylinder 13 is also moved back into its initial position. The tool 10 can be removed from the chisel holder 40, so that the wear-protection disk 54 is released. The chisel 50 can be removed.

variations are shown in FIGS. 5 to 8. In the representations in accordance with FIGS. 5 to 7, the holder exchange system, including the base support 30, the chisel holder 40 and the chisel 50, corresponds to the arrangement in accordance with FIGS. 1 to 4. FIG. 8 illustrates that the tools 10 in accordance with this invention are not solely restricted to employment with these basically known exchange systems. Rather, an individual case is also possible in which the chisel holder 40 is welded directly on a milling roller tube F, such as shown by the weld seam 44.

Figure 5:
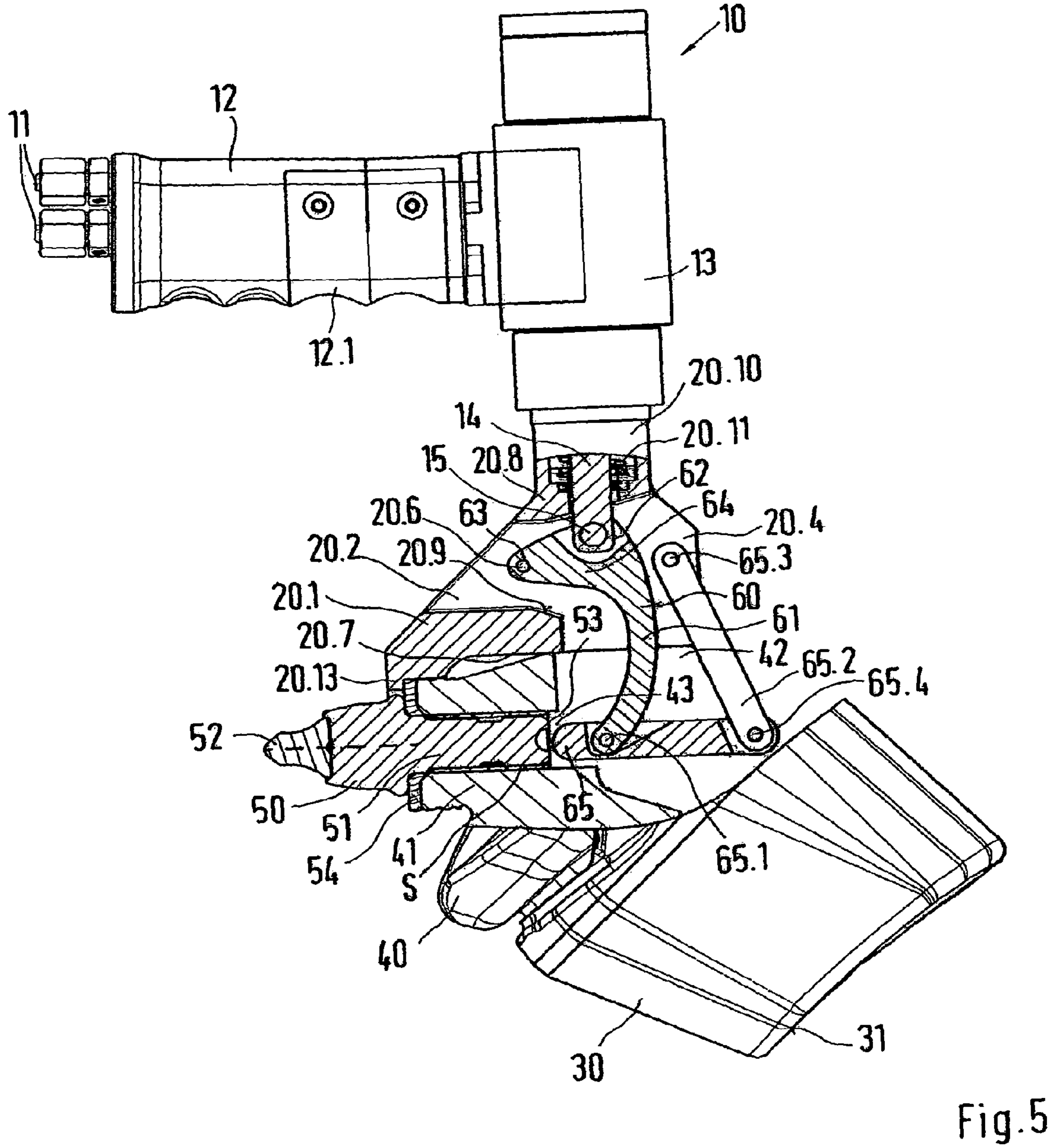
FIG. 5 shows the base support and the chisel holder in accordance with FIG. 1 in a lateral view and partial section, in which a further embodiment of the tool is assigned to the chisel holder.

Essentially, the tool embodiment in accordance with FIG. 5 corresponds to the embodiment in accordance with FIGS. 1 to 4. Only the actuating member 60 is constructed differently. This actuating member 60 is designed as a plane gear in the form of a four-link system, which saves structural space. Two levers 61, 65.2 are hingedly connected via pivot bearings 65.1, 65.4 to an expeller mandrel 65. In this case, the pivot axes are oriented perpendicularly with respect to the drawing plane.

Facing away from the expeller mandrel 65, the lever 61 is connected to the piston rod 14 via a pivot bearing, such as the seating bolt 20.6. This connecting area corresponds to the connecting area of the piston rod 14 to the actuating member 60 in accordance with FIGS. 1 to 4. Reference is made to the above explanations.

On an end facing away from the expeller mandrel 65, the second lever is connected to the lateral walls 20.4 by a pivot bearing 65. Again, the pivot axes are oriented perpendicularly with respect to the drawing plane. FIG. 5 shows the initial position of the tool. When actuating the trigger 12.1, the piston rod 14 is displaced linearly downward in the drawing plane. In the process, the levers 61 and 65.2, which are connected via the expeller mandrel 65, are synchronously pivoted in a clockwise direction. The expeller mandrel 65 simultaneously enters into the chisel receptacle 43 and pushes the chisel 50 on its support face 53 out of the chisel receptacle 43 while overcoming the clamping force of the clamping sleeve S.

After reaching the expelling position, the spring element 20.11 pushes the actuating member 60 back into the initial position shown in FIG. 5.

FIG. 6 shows a further tool embodiment, in which the adapter 20 again essentially corresponds to the adapters 20 in accordance with FIGS. 1 to 5. Thus, only the different characteristics are addressed, and reference is otherwise made to the above explanations. The connecting element 20.10 of the adapter 20 has a receptacle, into which a bent tube 66.2 is inserted and is held there. An element 66.7 of low flexural strength, in this case a link chain, such as is also used in principle in propulsion technology, is inserted into the tube 66.2. With its one end, the link chain is pivotably fastened to the seating receptacle 15 of the piston rod 14. At the other chain end, the last chain link constitutes or forms the expeller mandrel 65. FIG. 6 again shows the initial tool position. When actuating the trigger 12.1, the piston rod 14 is displaced, such as downward. In the process, it enters into a cylindrical connecting area of the tube 66.2.

The link chain is displaced in the tube 66.2, and in the process the tube 66.2 prevents the link chain from kinking. The expeller mandrel 65 is supported on the support face 53 of the chisel 50 and pushes it out of the chisel receptacle 43.

Once the link chain reaches the area of the chisel receptacle 43, the latter prevents it from kinking. After reaching the end position, the spring element 20.11 places the actuating member 60 back into its initial position shown in FIG. 6.

In the tool in accordance with FIG. 7, the tube 66.2 is preferably filled with a fluid 66.3 in place of the link chain. A piston 66.1 is connected to the piston rod 14 by a crosshead link. With its exterior contours, the piston 66.1 provides a seal on the interior wall of the cylindrical area of the tube 66.2 with the aid of a seal ring. A second piston 66.1 is sealingly seated at the other tube end, which is also cylindrically embodied. The piston 66.1 can be linearly displaced and supports the expeller mandrel 65. The tube 66.2 can enter into the chisel receptacle 43 through the cutout 42, so that the expeller mandrel 65 lies opposite the support face 53 of the chisel 65. During displacement of the piston rod 14, the piston 66.1 is pushed into the tube 66.6. The fluid 66.3 transmits this actuating movement to the second piston 66.6. In the process, the expeller mandrel 65 pushes the chisel 50 out of the chisel receptacle 43. During relief of the piston rod 14, the spring element 20.11 pushes the actuating member 60 into the initial position. The piston 66.1 is thus pulled upward. With the creation of a vacuum, the second piston 66.6 is also aspirated back into its initial position by the fluid 66.3.

In FIG. 8, a tool 10 is shown, in which an electric motor 66.8 is integrated into the handle 12. The output shaft 66.9 of the electric motor 66.8 has a spindle 66.11. Facing away from the electric motor 66.8, the output shaft 66.9 is rotatably fixed in place by a ball bearing 66.10. Also, the actuating member 60 is received in the adapter 20 between the two lateral walls 20.4 and in the present case has the shape of a disk. The edge of the actuating member 60 has a tooth arrangement 66.12, which meshes with the spindle 66.11.

The actuating member 60 is held in the adapter 20, and the seating receptacle 63 constitutes or forms the pivot axis. The actuating member 60 supports the expeller mandrel 65, which is formed as one part of, and eccentrically with respect to, the seating receptacle 63.

Again, the tool 10 can be inserted with the expeller mandrel 65 through the cutout 42 into the chisel receptacle 43, so that the expeller mandrel 65 lies opposite the support face 53 of the chisel 50. When actuating the trigger 12.1 on the handle 12, the electric motor 66.8 is activated. Thus, the output shaft 66.9 is set into rotary motion. Via the tooth arrangement 66.12, the spindle 66.11 turns the actuating member 60 in a clockwise direction. A sufficiently large lever arm is formed by the spacing of the tooth arrangement 66.12 with respect to the pivot bearing 63. A large force reduction is made possible by employing the spindle gear. Upon a rotation of the actuating member 60, the expeller mandrel 65 pushes the chisel 50 out of the chisel receptacle 43. After reaching the push-out position, the electric motor 66.8 changes directions and changes the direction of rotation until the actuating member 60 again reaches an end position shown in FIG. 8. The electric motor 66.8 is then switched off in this position.

It is understood that the described tool 10 can also be employed in connection with the most diverse, suitable chisel holders 40 and holder exchange systems.

German Patent Reference 10 2008 025 071.6-15, filed 26 May 2008, the priority document corresponding to this invention, to which a foreign priority benefit is claimed under Title 35, United States Code, Section 119, and its entire teachings are incorporated, by reference, into this specification.

What is claimed is:

1. A method of removing a chisel from a chisel holder, the method comprising:

(a) engaging a base element of a hand held power tool with a supporting surface of the chisel holder; and (b) moving an actuating member of the power tool in a curved path relative to the base element with power from a power source, and engaging a free end of the chisel with the actuating member and pushing the chisel out of the chisel holder with the actuating member.

2. The method of claim 1, wherein:

in step (b) the actuating member moves toward the base element.

3. The method of claim 1, wherein:

the power source includes a cylinder-piston system.

4. The method of claim 1, wherein:

the power source includes an electric motor.

5. The method of claim 1, wherein:

the power source includes a pressurized fluid.

6. The method of claim 1, wherein:

in step (b) the actuating member pivots relative to the base element.

7. The method of claim 1, further comprising:

limiting the movement of the actuating member by engagement of the actuating member with a stop arranged on the base element.

8. The method of claim 1, wherein:
in step (a) the supporting surface engaged by the base element is a wear disc associated with the chisel holder.

9. The method of claim 1, wherein:
step (a) further includes engaging the base element with a contact surface on the chisel holder spaced from the supporting surface of the chisel holder.

10. The method of claim 1, wherein:
step (b) further includes guiding the actuating member between two lateral walls of the base element.

11. The method of claim 1, further comprising:
biasing the actuating member toward an initial position out of engagement with the chisel via a biasing spring.

12. The method of claim 1, wherein:
in step (a), the hand held power tool includes a handle and a trigger; and step (b) further includes operating the trigger to actuate the power source.

13. The method of claim 1, wherein:
in step (a) the chisel has a mounting direction relative to the chisel holder, and the supporting surface faces opposite to the mounting direction.

14. The method of claim 1, wherein:
in step (b), the chisel holder has a chisel receiving passage and a cutout communicated with the chisel receiving passage, and the actuating member moves through the cutout into the chisel receiving passage.

15. The method of claim 1, wherein:
in step (a), the base element includes a fork-shaped support section engaged with the supporting surface; and
in step (b), the chisel is located between the forks of the fork-shaped support element.

16. The method of claim 1, wherein:
in step (b) the actuating member includes an element of low flexural strength; and
step (b) further includes conducting the element of low flexural strength in a guide.

17. A method of removing a chisel from a chisel holder, the chisel holder including a chisel receiving bore and a support surface adjacent a first inlet end of the bore, the method comprising:
(a) supporting a base element of a hand held power tool from the support surface of the chisel holder; and
(b) moving an actuating member of the power tool relative to the base element from an initial position wherein the actuating member does not engage the chisel to an expelling position, the actuating member moving into a second end of the bore and engaging the chisel to push the chisel outward relative to the chisel receiving bore as the actuating member moves from the initial position to the expelling position.

18. The method of claim 17, the chisel holder including a cutout communicated with the second end of the bore, wherein step (b) includes moving the actuating member through the cutout of the chisel holder.

19. The method of claim 17, wherein:
in step (b), the actuating member moves in a curved path relative to the base element.

20. The method of claim 17, wherein:
in step (b), the actuating member moves in a direction in which the support surface of the chisel holder faces.

21. The method of claim 17, wherein:
in step (a), the base element is indirectly supported from the support surface by a wear disc located between the base element and the support surface.

22. The method of claim 17, further comprising:
stopping the movement of the actuating member instep (b) by abutting the actuating member with a stop surface of the base element.

23. The method of claim 17, further comprising:
resiliently biasing the actuating member toward the initial position.

24. The method of claim 17, further comprising:
operating a trigger to actuate a power source to power the movement of the actuating member in step (b).

* * * * *

UNITED STATES PATENT AND TRADEMARK OFFICE

CERTIFICATE OF CORRECTION

PATENT NO. : 8,286,316 B2
APPLICATION NO. : 13/449651
DATED : October 16, 2012
INVENTOR(S) : Lehnert et al.

It is certified that error appears in the above-identified patent and that said Letters Patent is hereby corrected as shown below:

Column 6, line 49, insert --Tool-- before --variations--.

Signed and Sealed this
Fourth Day of December, 2012

David J. Kappos
*Director of the United States Patent and Trademark Office*